US010291162B1

(12) United States Patent
Heins

(10) Patent No.: US 10,291,162 B1
(45) Date of Patent: May 14, 2019

(54) FLYBACK MODE PROCESS HARNESSING GENERATOR ACTION IN ELECTRIC MOTOR

(71) Applicant: Thane C. Heins, Almonte (CA)

(72) Inventor: Thane C. Heins, Almonte (CA)

(*) Notice: Subject to any disclaimer, the term of this patent is extended or adjusted under 35 U.S.C. 154(b) by 55 days.

(21) Appl. No.: 15/435,768

(22) Filed: Feb. 17, 2017

Related U.S. Application Data

(60) Provisional application No. 62/296,116, filed on Feb. 17, 2016.

(51) Int. Cl.
*H02P 7/18* (2006.01)
*H02K 11/20* (2016.01)

(52) U.S. Cl.
CPC ............... *H02P 7/18* (2013.01); *H02K 11/20* (2016.01)

(58) Field of Classification Search
CPC .. H02P 7/00; H02P 6/185; H02P 27/08; H02P 2209/09; H02K 11/20
See application file for complete search history.

(56) References Cited

U.S. PATENT DOCUMENTS

| 4,055,789 | A | * | 10/1977 | Lasater | ..................... H02J 7/14 318/139 |
| 6,114,827 | A | * | 9/2000 | Alvaro | ................... H02K 29/10 318/265 |
| 8,860,273 | B2 | * | 10/2014 | Babcock | ................ H02K 21/24 310/156.43 |
| 2014/0111054 | A1 | * | 4/2014 | Heins | ...................... H02K 3/00 310/195 |
| 2016/0352272 | A1 | * | 12/2016 | Hijikata | ................... H02P 8/16 |

* cited by examiner

*Primary Examiner* — Eduardo Colon Santana
*Assistant Examiner* — Said Bouziane
(74) *Attorney, Agent, or Firm* — Leslie Virany

(57) ABSTRACT

This invention pertains to a solution to the parasitic problem of motor armature reaction/generator action in electric motors which causes undesired effects such as neutral plane shift and flux weakening. Prior art interventions such as interpoles and compensating windings add to complexity and cost of electric motors without satisfactorily solving the problematic issues. This invention pertains to a novel method of employing the same primary magnetic field multiple times—first to change electrical input power to mechanical output power and then to reconvert this same stored electromagnetic field energy back into electric energy for storage and reuse. The primary electromagnetic field energy is used a second time after it has been used to create the desired change in kinetic energy of the secondary magnetic field being acted upon when it is allowed to collapse back into electric storage as it would do naturally once the input current is removed.

16 Claims, 9 Drawing Sheets

Magnetic Field of a Straight Current Carrying Wire
$$B = \frac{\mu_0 I}{2\pi d}$$
$B$ = magnetic field strength at distance $d$
$I$ = current
$\mu_0$ = permeability of free space
($4\pi \times 10^{-7}$ T·m/A)
$d$ = distance from the wire
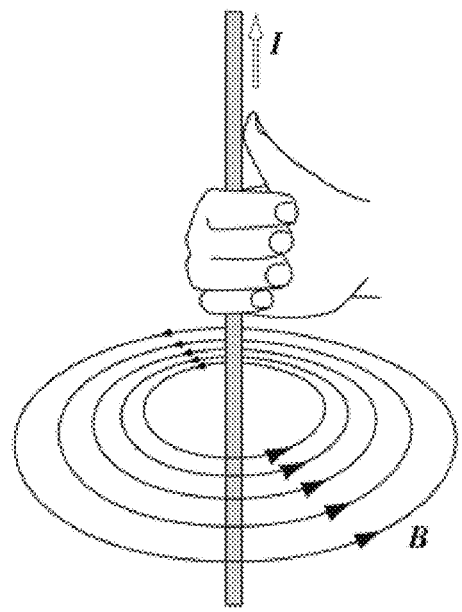
Fig. 1 *(PRIOR ART)*
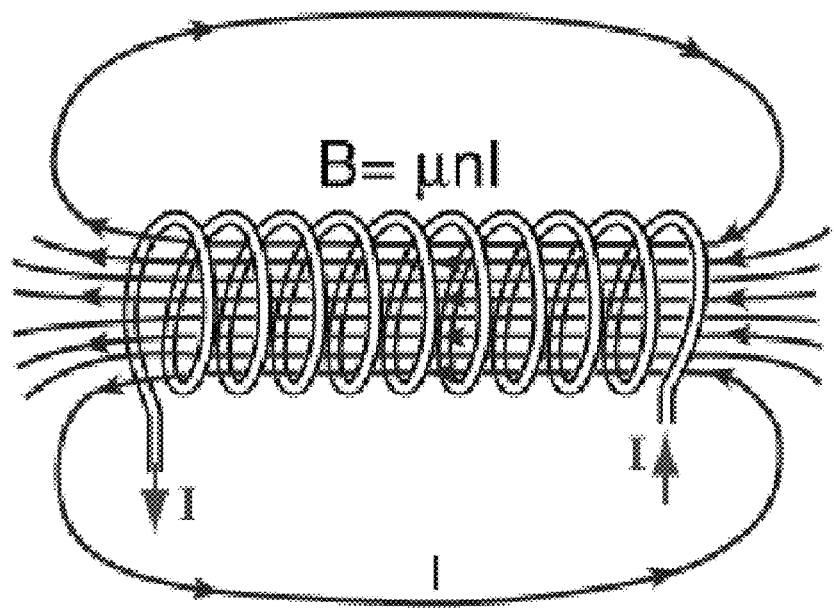
Fig. 2 *(PRIOR ART)*

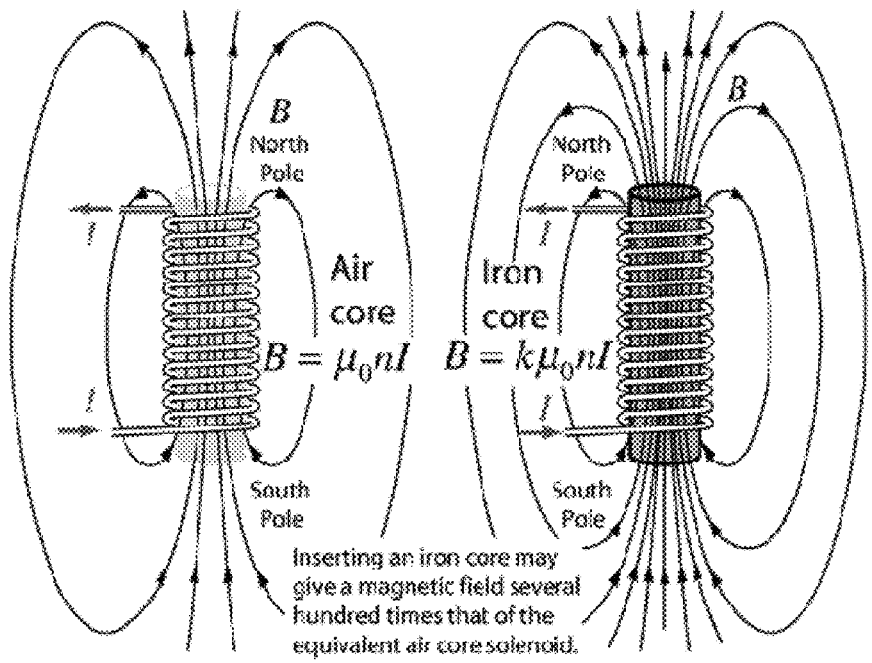
Fig. 3 *(PRIOR ART)*
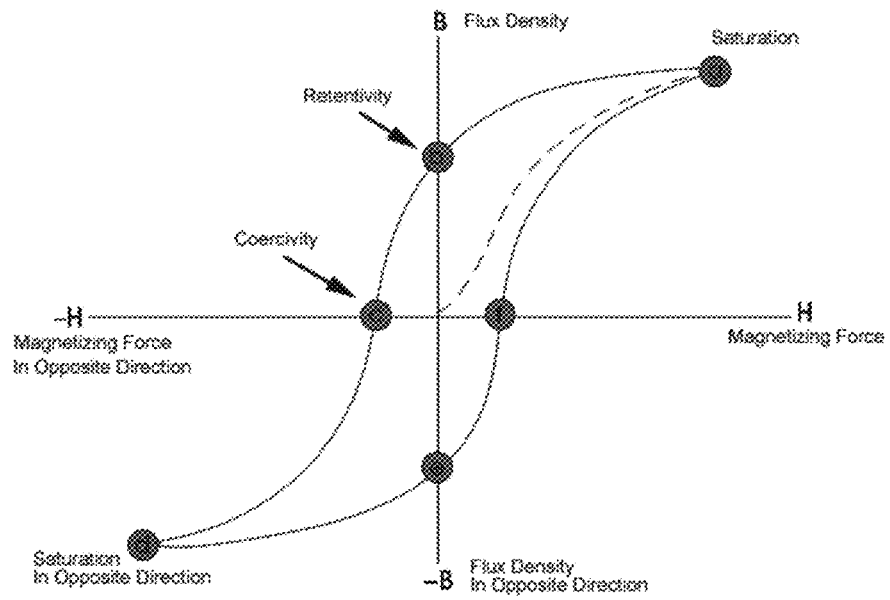
Fig. 4 *(PRIOR ART)*

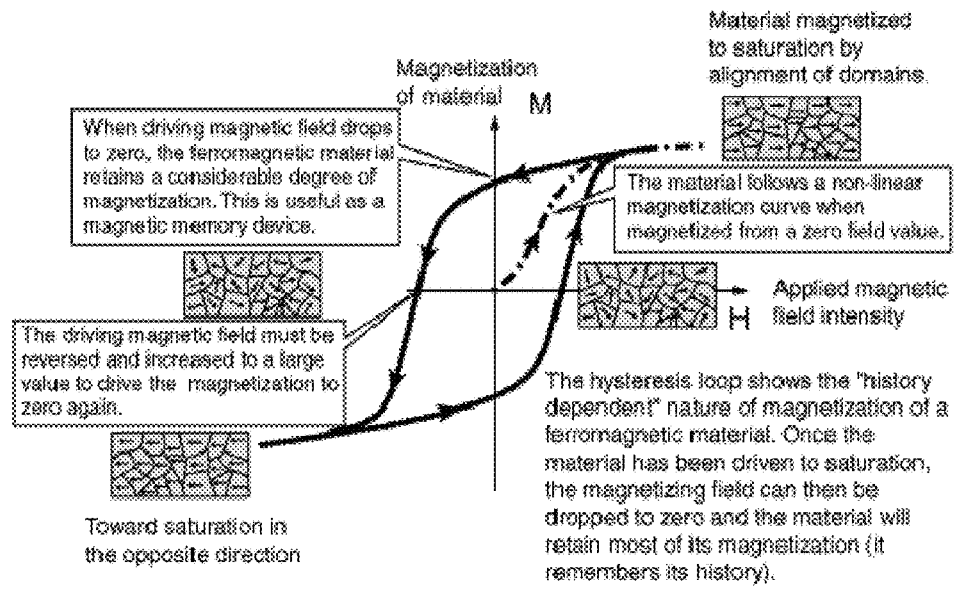
Fig. 5 *(PRIOR ART)*
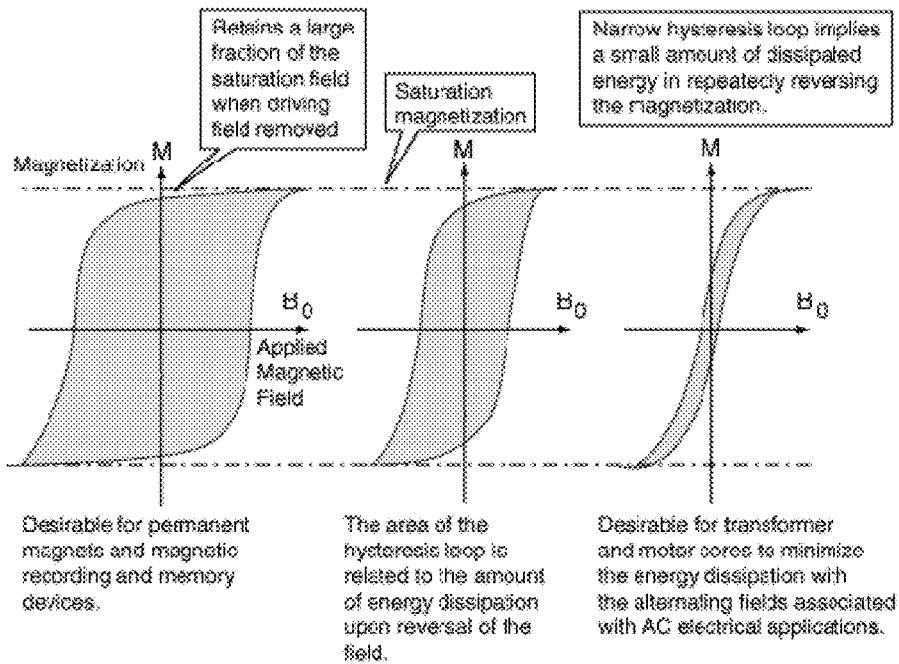
Fig. 6 *(PRIOR ART)*

Fig. 9 *(PRIOR ART)*

List of Components

T1 120AC Primary with Dual Secondary
Q1 IRF3710
Q2 NTE123A
U1 CYN17 Optical Isolator
U2 TCRT1000 Optical Motor Coil Switch
D1 1N5408 Motor Coil Flyback Diode
C1 35v 470μF
C2 35v 470μF
R1 4.74k
R2 10k
R3 4.74k
R4 100
R5 4.74k
R6 100
S1 Single Power Switch
S2 5A Fuse Holder
S3 10A Fuse Holder 1) Battery
2) Controller
3) Motor Stator Coil
4) Rotor Magnet
5) Rotor
6) Connecting Wires

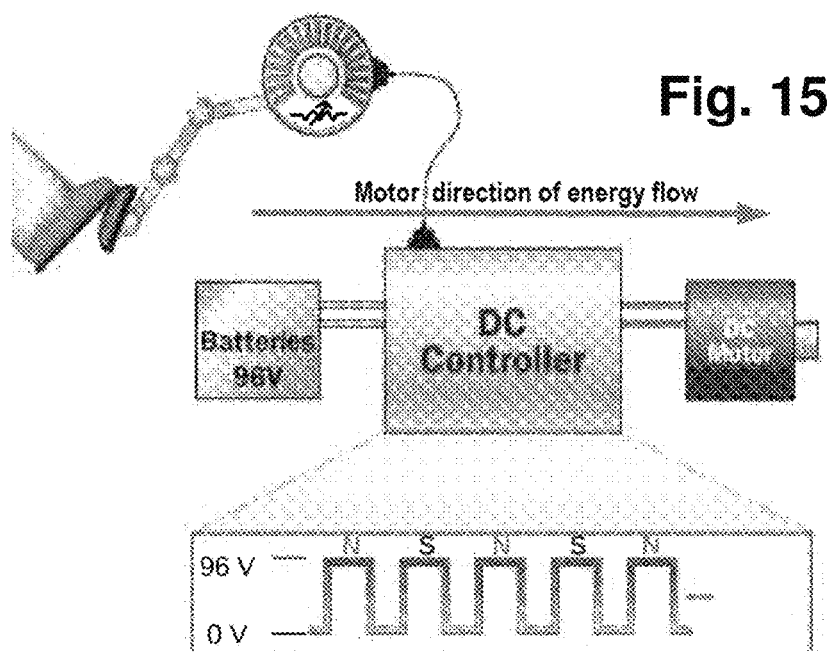
Fig. 15A *(PRIOR ART)*
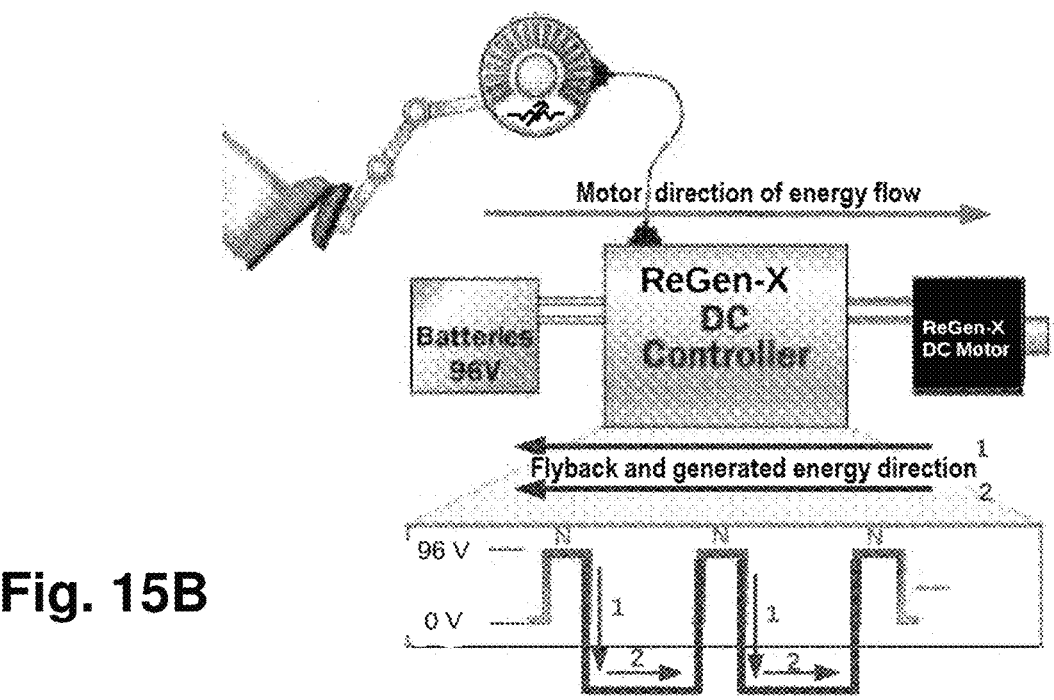
Fig. 15B

FLYBACK MODE PROCESS HARNESSING GENERATOR ACTION IN ELECTRIC MOTOR

BACKGROUND OF THE INVENTION

An electric motor is a machine that is used to convert electrical energy into mechanical energy. When electric current is passed through a current carrying conductor a magnetic field is produced in the area around it. The magnitude of current dictates the strength of the magnetic field that is produced. Magnetic fields are the fundamental mechanism by which energy is converted from one form to another in motors, generators and transformers.

Four basic principles describe how magnetic fields are used in these devices.
1) A current-carrying wire produces a magnetic field in the area around it.
2) A time-changing magnetic field induces a voltage in a coil of wire if it passes through that coil. (This is the basis of transformer action).
3) A current-carrying wire in the presence of a magnetic field has a force induced on it. (This is the basis of motor action).
4) A moving wire in the presence of a magnetic field has a voltage induced in it. (This is the basis of generator action).

In the operation of an electric motor, electric power is delivered to a coil of wire (inductor) which is generally wound around an inductor core (ferromagnetic material and a path of integration used to focus the (primary) magnetic field on the motor's stator into a desired location such as another (secondary) magnetic field in order to effect a change in the kinetic energy of the second magnetic field) on the rotor.

Motor coils (inductors) can be made without cores; however the magnetic field produced by such motor coils lacks focus is divergent and weak and lacks the strength of a ferromagnetic cored inductor with its specifically focused magnetic field direction.

All electric motors currently alternate the motor coil's (primary) induced electromagnetic field polarity in concert with the rotor's (secondary) alternating magnetic field to affect motor action and produce mechanical power.

This (primary) induced electromagnetic field polarity alternation must be done very quickly and artificially because the motor coil's 5 time constant rise time would prohibit timely motor coil electromagnetic field pole orientation reversal.

As a result the electromagnetic field energy that is initially established by the motor coil; it must therefore be dissipated into free space before its magnetic field direction can be changed to produce an alternate electromagnetic field polarity as required by the rotor's alternating magnetic field.

The electromagnetic field alternation and free space energy dissipation occurs when the energy magnitude is at its maximum level and as a result the energy dissipation and negative effects are always at the maximum level possible.

Electromagnetic field radiation exposure as a result of the free space energy dissipation produces negative side effects when it comes in contact with living tissue and the exposure and negative side effects that result are cumulative over time.

Parasitic problems exist in all electric motors, including motor armature reaction/generator action in a motor which causes undesired effects such as neutral plane shift, flux weakening and the required solution interventions such as interpoles and compensating windings which add to the complexity and cost of electric motors but do not completely solve the problematic issues.

Armature Reaction in a motor is a problem that manifests itself when the magnetic field windings of a DC machine are connected to a power supply and the rotor of the machine is turned by an external mechanical power source. In this case a voltage will be induced in the conductors of the rotor and will be rectified into DC output by the action of the machine's commutator. When a load is connected to the terminals of the machine a current will flow in its armature windings and this current will produce a magnetic field of its own, which will distort the original magnetic field from the machine's poles. This distortion of the flux in a machine as the load increases is called Armature Reaction and it causes two serious problems in DC machines.

The first problem caused by Armature Reaction is Neutral Plane Shift where the magnetic flux in the air gap of the machine is skewed (variable); sometimes it subtracts from the pole flux and sometimes it adds to the pole flux. The amount of neutral plane shift depends on the amount of rotor current and hence the load on the machine. The problem associated with neutral plane shift manifests itself in the commutator when the commutator must short out commutator segments just at the moment when the voltage across these segments is equal to zero.

When the machine is loaded, neutral plane shift occurs and the brushes short out commutator segments when the voltage across them is not zero. The result is a current flow circulating between the shorted segments and large sparks at the brushes when the current path is interrupted as the brush leaves the commutator segments. The end result is arcing and sparking at the brushes which is a very serious problem since it leads to drastically reduced brush life, pitting of the commutator segments and greatly increasing maintenance costs.

Neutral plane shift cannot be fixed by placing the brushes over the full-load neutral plane, because then they would generate a spark at no-load. In extreme cases, the neutral plane shift can lead to Flashover in the commutator segments near the brushes. Flashover occurs when the air above brushes in a machine become ionized as a result of the sparking of the brushes.

Flashover occurs when the voltage of adjacent commutator segments gets large enough to sustain an arc in the ionized air above them. If Flashover occurs, the resulting arc can melt the commutator's surface. The second major problem caused by armature reaction is flux weakening.

Most machines operate at flux densities near the saturation point, therefore at locations on the pole surfaces where the rotor magnetomotive force adds to the pole magnetomotive force, only a small increase in flux occurs. But locations on the pole surfaces where the rotor magnetomotive force subtracts from the pole magnetomotive force, there is a large decrease in flux and the net result is that the total average flux under the entire pole face is decreased. Flux weakening causes problems in both generators and motors.

In generators the effect of flux weakening is simply to reduce the voltage supplied by the generator for any given load. A current carrying-conductor produces its own magnetic field, and this magnetic field affects the main magnetic field of the alternator. It has two undesirable effects, either it distorts the main field or it reduces the main field flux or both, which can deteriorate the performance of the machine.

When the field gets distorted, it is known as cross magnetizing effect resulting in reduced flux known as demagnetizing effect.

The electromechanical energy conversion takes place through the magnetic field as a medium. Due to relative motion between armature conductors and the main field, an EMF is induced in the armature windings whose magnitude depends upon the relative speed as well as the magnetic flux. Due to generator armature reaction, flux is reduced or distorted, the net EMF induced is also affected and hence the performance of the machine degrades.

In motors, the effect can be more serious because when the flux in a motor decreases its speed increases and increasing the speed of a motor can increase its load, resulting in more flux weakening. It is possible for some DC motors to reach a runaway condition as a result of flux weakening, where the speed of the motor just keeps increasing until the machine is disconnected from the power line or until it destroys itself.

Problems associated with the current flow reversal and the timing required to accomplish this is called inductive kick. If we assume that a machine turning at 800 RPM having 50 commutator segments (a reasonable number for a typical motor), each commutator segment moves under a brush and must clear it again in 0.0015 seconds. With even a tiny inductance in the armature winding loop, a very significant voltage kick will be introduced in the shorted commutator segment and this high voltage naturally causes sparking at the brushes, resulting in the same arcing problems associated with neutral plane shift.

Two approaches are currently used to partially or completely correct the problems of armature reaction and inductive kick voltages; they are interpoles and compensating windings. The use of commutating poles or interpoles is very common because they correct sparking problems of DC machines at a fairly low cost however they do nothing for the flux distortion under the pole faces, so the flux weakening problem is still present. Most medium-size, general purpose motors correct for sparking problems with interpoles and just live with the flux-weakening effects. For very heavy, severe duty cycle motors, the flux-weakening problem can be a very serious issue.

In order to completely cancel armature reaction and eliminate both neutral-plane shift and flux weakening, a different technique was developed called compensating windings which requires the placement of compensating windings in slots carved into the faces of the poles parallel to the rotor conductors, to cancel the distortion effects of armature reaction. The major disadvantage of compensating windings is that they are very expensive, since they must be machined into the faces of the poles and because of the expense of having compensating windings and interpoles, these windings are used only where the extremely severe nature of a motor's duty demands them.

SUMMARY OF THE INVENTION

This invention pertains to motors without cores or having cores but primarily the latter, cored design and a more efficient use of the magnetic field energy that is created, a more efficient method of creating said magnetic fields and a method of reducing losses inherent in the core material itself.

This invention also pertains to creating a symbiotic solution to parasitic problems that exists in all electric motors.

The present invention pertains to electric motor performance and a more efficient way to produce (primary) stator or rotor magnetic fields in electric motors.

This invention also pertains to a novel method of employing the same primary magnetic field in a motor more than once—first to change electrical input power to mechanical output power (via an electromagnetic field force acting against another magnetic field) which does the work changing the kinetic energy of the motor's rotor and then to reconvert this same stored electromagnetic field energy back into electric energy which can then be stored and reused again at some other time as required.

The primary electromagnetic field energy can be used a second time, after it has been used to create the desired (motor action, motive force)/change in kinetic energy of the secondary magnetic field being acted upon when it is allowed to collapse back into an electric storage container such as a battery as it would do naturally if permitted to once the input current is removed.

This invention allows for and deliberately encourages and utilizes generator action in a motor which occurs naturally and without restraint and to use this otherwise parasitic electric motor consequence as a benefit to the overall performance of said motor invention.

Inventor's co-pending application Ser. No. 15/137,020 is incorporated herein by reference. Inventor's co-pending application published as 20140111054 is incorporated herein by reference.

BRIEF DESCRIPTION OF DRAWINGS

FIG. 1 shows Magnetic Field around a Current Carrying Conductor and the Relationships Therein.

FIG. 2 demonstrates the Magnetic Field Strength in an Air Core Solenoid.

FIG. 3 compares Magnetic Field Strength in Air and Iron Core Solenoids.

FIG. 4 provides details regarding important parts of the Iron Core Hysteresis Curve FIG. 5 depicts the history aspect of the Iron Core Hysteresis Curve.

FIG. 6 shows various Iron Core Hysteresis Curves.

FIGS. 15: 15A & B compare electromagnetic field production of a prior art EV with an EV equipped with the present invention.

GLOSSARY

Figure 7:
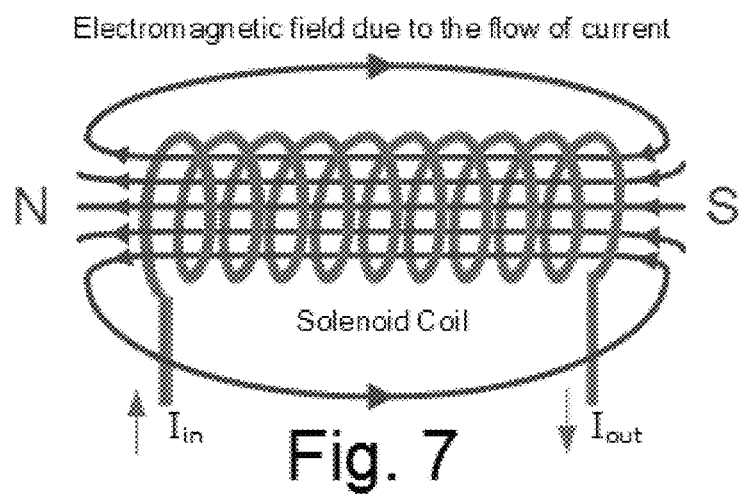
FIG. 7 shows the Magnetic Field Direction in a Solenoid/Motor Coil/Inductor.

Faraday's Law: "The induced electromotive force in any closed circuit is equal to the negative of the time rate of change of the magnetic flux enclosed by the circuit." (source Wikipedia)

The term "Coil" or the like is used herein to mean a generator or motor coil, comprises a continuous electrically conducting insulated wire arranged in loops substantially parallel to a plane perpendicular to a single axis.

The term "aereal exposure" or "effective area" or "projected area" or "enclosed loop area" or "exposed loop area" or the like is used herein to mean, in connection with Faraday's Law and its applications, the enclosed area projected perpendicularly, in the manner defined with respect to Faraday's Law, to the external magnetic field, The term "dead center point" or the like is used herein to mean a point at which a generator coil presents zero effective area to any given magnet.

The term "TDC" or "top dead center" or the like is used herein to mean a point at which a generator coil presents zero effective area to a specific magnet. Often TDC may be used in the art to describe the point at which the coil has rotated 90 degrees away from its point of closest proximity to a north pole.

The term "conductance" or the like is used herein to mean the reciprocal of "resistance."

The term "rate of change" or the like is used herein to mean of a quantity Q is synonymous herein with $dQ/dt$.

The term "maximal rate of change" is used herein to mean a point at which a quantity is changing at its fastest or exhibiting a very sudden change.

The term "capacitive conduction" is used herein to mean the current I which is caused to flow in a capacitive element due to a voltage V, as given by $I=CdV/dt$, where C is the capacitance of the element.

The term BEMF or back-EMF is used herein to refer to a coil's induced magnetic resistance or counter-electromotive-induced-torque The term Impedance is used herein to refer to Ohmic, capacitive or other resistance of a current to an applied voltage.

The term diconnectably is used herein to describe a reversible manner of making a connection; a connection which may thereafter be returned to its disconnected state.

The term Flux or "magnetic flux" is used herein to refer to the number of magnetic field lines passing through a given area.

The terms "frequency" and "oscillation" and the like are used herein to refer to their respective customary designations in accordance with the practice of Fourier Analysis in Circuit Theory.

The terms "primary" and "secondary," when applied herein to magnetic polarity in a rotating motor or generator refer respectively to a first magnetic polarity being intentionally interacted with and a second magnetic polarity being unavoidably interacted with.

The term "Flyback Mode" or the like, as used herein, is a mode of operation whereby the magnetic field energy stored externally around a motor coil is allowed to be reconverted back into electrical energy.

The term ReGenX is used herein to refer to embodiments as disclosed in the present inventor's USPGPub #20140111054, which is incorporated herein by reference. The term ReGenX is variously also applied to embodiments of the present invention, although the present invention does not necessarily rely on embodiments of 20140111054 to achieve the benefits described herein.

The term "Shock-it" refers to a circuit apparatus comprising elements of the present invention.

DETAILED DESCRIPTION

The Present Motor invention is a new type of motor design and a new type of motor operational paradigm that reduces the energy required to establish and specifically to reverse the motor coil's alternating magnetic field polarities. while also providing a magnetic field energy recuperation (flyback mode) process which operates synergistically in concert with natural (and previously considered parasitic) generator action in a motor.

The ReGenX Generator Coil is an improvement whereby the conventional generator armature reaction which produces a counter electromotive torque is reversed and produces a complementary electromotive torque in its place.

In accordance with the present invention, using the herein-described improved recuperation (flyback) process which reduces and or eliminates the well-known and scientifically documented negative living tissue destruction side effects associated with electromagnetic radiation exposure.

Because the motor coil of the present invention only pulses its electromagnetic field energy in one magnetic field direction and because there is no deliberate and artificial reversal of the motor coil's electromagnetic field polarity—the field is allowed to collapse naturally back into the source rather than being dissipated externally, in accordance with the present invention the motor coil's electromagnetic field energy dissipation into free space is therefore significantly reduced and or eliminated altogether. Living tissue that is placed in the vicinity of this motor will incur much fewer negative side effects as a result if any at all.

This improved motor performance and electromagnetic field living tissue exposure reduction becomes important when considering electric motor performance in electric vehicles where the occupants essentially must reside in a Faraday Cage (a metal container shielded from ground by rubber wheels) and where the electromagnetic field radiation exposure to the electric vehicle passengers is at its maximum.

The energy that is stored in the motor coil's external electromagnetic field is returned to the source by the Motor control circuit of the present invention when it has completed its task of inducing rotation in the motor's rotor. The ReGenX Motor's energy losses are restricted primarily to copper wire losses and the core hysteresis losses are reduced and or eliminated.

An electric motor of the present invention is comprised of alternating magnetic polarities on the rotor and when spun by an external source operates as an electric generator producing alternating electric output power (AC).

As previously noted, conventional motor design alternates the motor coil's induced magnetic field to account for the rotor's alternating magnetic poles which is very inefficient. The energy stored in the motor coil's external electromagnetic field is wasted (dissipated), the energy stored in the external electromagnetic field creates issues regarding sparking on the commutator when it is deliberately and hastily shorted out prior to reversal, hysteresis core losses must be overcome and generator action in the motor causes flux weakening and reduced motor performance.

The motor of the present invention is a much more efficient motor design because a portion of the electromagnetic field energy is returned to the source and does not need to be shorted out by the commutator thus reducing brush sparking and brush commutator damage In addition energy losses associated with motor magnetic pole reversal; and the associated core hysteresis losses are eliminated as are the parasitic problems associated with generation action in a motor which is used instead to generate usable electrical power.

The Motor of the present invention employs the ReGenX Generator Coil performance in the generator action such that generator armature reaction is reversed.

When the Motor of the present invention is operating in ReGenX Generator Mode from a Time T2 until a Time T3, (as described further below in connection with FIG. 10) it is inducing an electric current which is being sent to the storage container in concert with the return current being sent from the motor coil's collapsing electromagnetic field energy and it is also contributing to the motor's net motive force (rotor acceleration) because the ReGenX Generator coil operation creates a complementary electromotive torque when delivering electric current to a load.

The energy required to turn and reorient the magnetic domains in the motor coil's core which leads to common types of energy loss in all electric machines is provided by the inertia of the rotor and the complementary electromotive torque provided by the ReGenX Generator coil.

FIG. 2 shows how a magnetic field is produced in a solenoid/motor coil.

There are several physical factors which affect the conversion efficiency from electrical energy to mechanical energy and a primary area of interest with regards to the present invention is Core Hysteresis.

All Ferromagnetic material used in all conventional electric motors has some magnitude of Hysteresis (magnetic memory) in them which is prohibitive to the efficiency of the motor action and the conversion of electrical energy to mechanical energy. When a current flows in the motor coil and a magnetic field is produced around the coil, the core material's hysteresis must be overpowered and reversed continually resulting in efficiency losses requiring extra energy to be supplied at a cost. For example; as current flows in the motor coil winding it produces a magnetic field in the core. A certain amount of the energy potential is required to overcome the initial core material's hysteresis.

When an external magnetic field is applied to a block of iron, it causes the magnetic domains that happen to point in a certain direction to reorient themselves according to the direction of the applied external field. The magnetic domains pointing in the direction of the magnetic field grow because the atoms at their boundaries physically switch orientation to align themselves with the applied magnetic field direction. The extra atoms aligned with the field increase the magnetic flux in the iron, which in turn causes more atoms to switch orientation, further increasing the strength of the magnetic field.

It is this positive feedback effect that causes iron to have a permeability which is much higher than air (over 6000 times more in some cases). Permeability, also called magnetic permeability, is a constant of proportionality that exists between magnetic induction and magnetic field intensity. This constant is equal to approximately $1.257 \times 10^{-6}$ henry per meter (H/m) in free space (a vacuum). As the strength of the external magnetic field continues to increase, whole domains which are aligned in the wrong direction eventually reorient themselves as a unit to line up uniformly with the externally applied field's direction.

Finally, when nearly all the atoms and all the domains in the iron are lined up with the external field, any further increase in the magnetomotive force can cause only the same flux increase that it would in free space. (Once everything is aligned, there can be no more feedback effect to strengthen the field). At this point the iron core is saturated with magnetic flux. The key to hysteresis is that when the external magnetic field is removed, the domains do not completely re-randomize themselves again. The reason they do not re-randomize themselves again is because turning the domains requires energy. The original domain orientation was provided by the energy supplied by the external magnetic field and when the field is removed, there is no source of energy to cause the domains to rotate back.

In this case the piece of iron is considered to be a permanent magnet. Once the domains are aligned, some of them will remain aligned (due to the material's remnant flux level) until a source of external energy is supplied to reorient them back (coercive force requirement). The fact that turning domains in the iron requires energy leads to common types of energy loss in all electric machines.

The hysteresis loss in an iron core is the energy required to accomplish the reorientation of the domains during each cycle of the alternating current applied to the core. The area enclosed in the hysteresis loop formed by applying an alternating current to the core is directly proportional to the energy loss in a given AC cycle. In all conventional motor operation; once the initial induced motor coil's magnetic field has done its job changing the kinetic energy of the secondary magnetic field, the current is then immediately reversed in the coil.

A portion of the available current being applied must also be used to force (coercive force) the already established magnetic field direction to change direction due to the core's hysteresis magnitude as shown in FIG. 3. The greater the hysteresis magnitude of the motor coil's core material the more energy is required to overcome it and force the magnetic polarity to change direction resulting in motor efficiency losses during the conversion from electrical to mechanical energy.

However if the electrical energy supplied to the motor coil was suddenly cut off and not immediately reversed and an alternate current route was provided, the energy stored in the magnetic field around the coil would naturally collapse on its own. In the process some of the domains in the core are reoriented in and a reduction in externally applied energy (coercive force) would be required to completely reorient all the domains. This is one of the primary operational premises of the Motor of the present invention.

As the stored magnetic field energy collapses the magnitude of the established magnetic field inside the core diminishes accordingly and the energy stored in the coil's magnetic field does some of the work required to coercively force the domains back to their original direction. Eventually it is reduced to a minimal level and even to negligible levels if high quality core materials are employed with narrow hysteresis curves as shown in FIG. 5.

Ideally an electric motor would employ core materials with the narrowest hysteresis curve possible in order to increase efficiency and save operating costs when using better materials; however these materials come with an increased cost. Market place realities do not always allow for optimum core material use or optimum motor efficiency performance as a result. All current electric motor designs apply energy to create a magnetic field in one direction and then immediately force it into another direction which requires extra energy which results in efficiency losses in the process.

The present ReGenX Motor embodiment circumvents the core hysteresis issue by delivering electric current to the motor coil in one direction only and establishing magnetic fields inside the core in one direction only. As a result the magnetic field direction established in the core does not need to be deliberately and forcibly reversed and dissipated into free space as with all conventional motor operation.

When the electric current delivered to the motor coil ceases and the electromagnetic field energy is stored externally in the magnetic field around the motor coil it is not shorted out by the motor's commutator and reversed immediately but rather allowed to naturally collapse back into the source.

Figure 11:
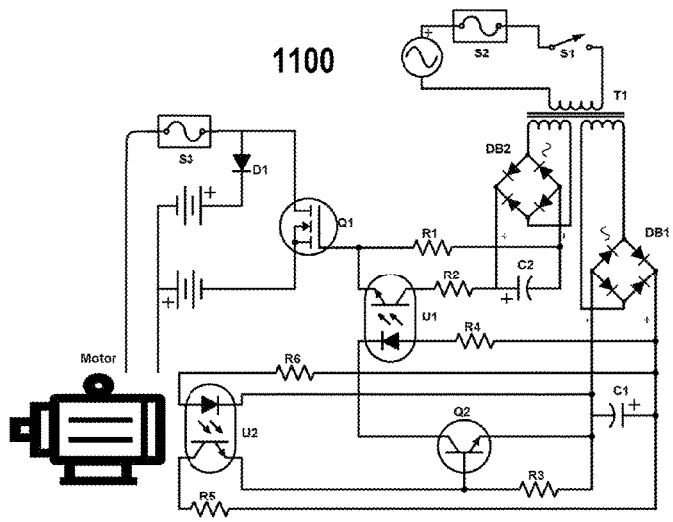
FIG. 11 shows a "Shock-it" motor control circuit designed to achieve the benefits of the present invention.

This process is achieved by using a specifically designed motor circuit 1100 (see FIG. 11) inherent to this invention or commutator design which allows for electric current to be delivered from the source to the motor coil in order to provide motive force to the motor's rotor and then for the coil to stay electrically connected to the source without an immediate current direction reversal.

This operational process allows for the coil's externally induced magnetic field to be established in one direction and then to allow it to collapse back safely into the source (energy storage device) as it would do naturally if not immediately forced in the opposite direction by the motor circuit or commutator and as a result it reduces the external energy required to overcome the core's hysteresis. In addition significantly minimizes the physical damage caused by shorting out of the magnetic field energy by the motor's brushes and commutator and the cost associated with living tissue damage to the dissipated electromagnetic field radiation.

This process significantly reduces the coercive force (and externally applied energy) required to reorient the motor core's domains against its remnant flux levels. Hysteresis losses are reduced accordingly. Electric motors and generators simultaneously employ alternating (primary) rotor magnetic fields and alternating (secondary) stator magnetic fields.

As previously mentioned the stator coil's magnetic field is repeatedly alternated in order to effect and change the kinetic energy of the rotor's magnetic field and produce rotation and motive force on the motor's output drive shaft. The faster the motor's rotor turns the greater the parasitic energy losses in the cores and the greater the parasitic induced generator action/motor armature reaction and their resulting subsequent energy losses.

In order to mitigate energy losses associated with core hysteresis this invention only pulses electric current in one direction only and produces only one magnetic field direction acting on two opposite magnetic poles at the same time.

Figure 10:
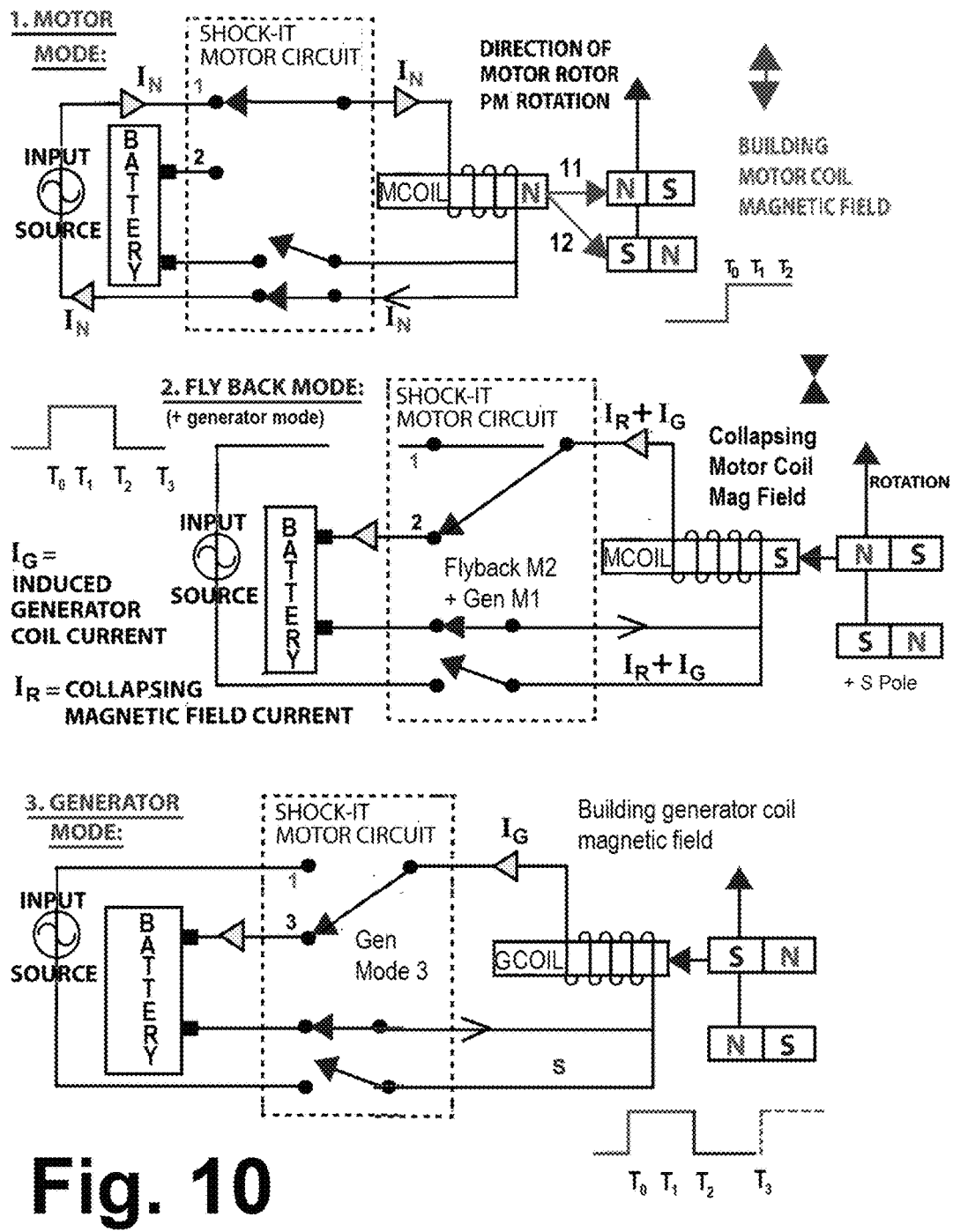
FIG. 10 shows the Motor Circuit of the present invention.

It does not alternate electromagnetic motor coil pulses to effect the alternating rotor poles, instead it allows for the alternate (opposite) rotor magnetic pole to pass by the motor coil naturally and to induce a beneficial voltage in the coil as it would naturally as well. FIG. 10, Motor Mode (1) shows how the motor coil of the present invention pulses a repelling magnetic field (11) into the vicinity of the rotor's identical magnetic field and how it simultaneously attracts (12) the opposite rotor magnetic field.

When the rotor's alternate (non-motor coil pulse effected) rotor pole passes by the coil and it induces a voltage in the coil, the current and more specifically the current flow direction produced is in the same direction as the collapsing current that is returning to the source from the collapsing motor magnetic field.

Because the collapsing motor current and the induced generator current are in the same direction they are cumulative. The present coil invention reduces core hysteresis losses and the input energy required to overcome them in addition to the losses (and costs) associated with generator armature reaction or generator action inherent in all electric motor operation.

FIG. 1 shows how the production of a Magnetic Field is governed by a law of physics called Ampere's law where the relationship between the magnetic field intensity B produced by the current $I_{net}$ is shown. For any closed loop path, the sum of the products of the length elements and the magnetic field in the direction of the length elements is proportional to the electric current enclosed in the loop. (magnetic permeability ($\mu_0$) is the constant of proportionality.

FIG. 2 demonstrates the magnetic field produced when a wire is wound into an air core solenoid the magnetic field produced is focused in the center. The magnetic field is concentrated into a nearly uniform field in the center of a long solenoid. The field outside is weak and divergent.

FIG. 3 shows an iron cored solenoid (inductor/motor coil) where the magnetic field strength is determined by the relative permeability of the core material used, the number of turns employed and the length of the core (differential element). Inserting an iron core into the solenoid will increase the strength of the magnetic field produced by several hundred times but the penalty is that the iron core will introduce hysteresis losses into the motor coil's performance as explained previously.

FIG. 4 provides the various terminologies with respect to inductor core hysteresis.

FIG. 5 shows how the hysteresis loop depicts the magnetization "history" dependent nature of ferromagnetic material, where even when the magnetization field drops to zero the material retains a certain degree of magnetization and the driving magnetic field must be reversed and increased to a large value in order to drive the magnetization back to zero again.

FIG. 6 shows various hysteresis curves and an air core solenoid/motor coil's curve would be the narrowest and most ideal but the magnetic field strength produced would be the weakest.

As explained previously the electrical energy input to the motor coil is the external energy source required to drive the core's magnetization back to zero against the core's hysteresis and then to drive it in the opposite direction in order to change the motor coil's magnetic polarity as shown in FIG. 7.

FIG. 7 also shows the magnetic field polarities produced by a motor coil which is dictated by the direction of the input current. A North Pole magnetic field is produced on the left hand side of the page and South Pole on the right hand side.

These magnetic field polarities are reversed when the input current direction is reversed such that a North Pole will be produced on the right side of the page and a South Pole on the right hand side.

In order to reverse the magnetic field direction the motor coil's input energy must first overcome the hysteresis resistance in the core and therefore the less core hysteresis present the less input energy is required to reverse it. The faster an electric motor operates the faster the magnetic fields in the motor must be reversed and the more external input energy is required to reverse the core magnetic fields against the core's hysteresis.

Figure 8:
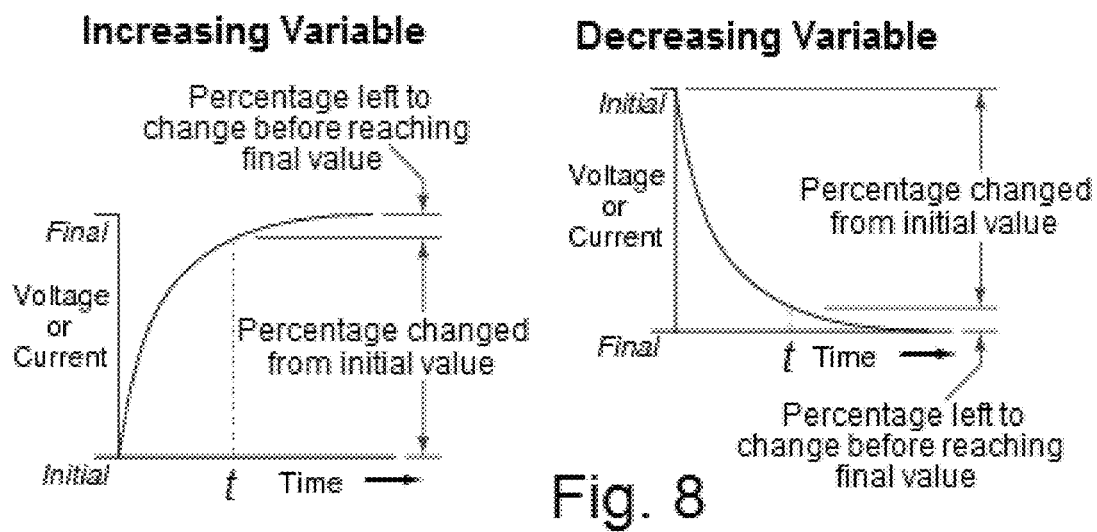
FIG. 8 shows the inductor transient nature of a motor coil with inductor Time Constant Rise Time and Decay Time.

The proposed solution being offered by this present invention is to pulse the motor coil's current in one direction only and to not use the motor input current (external energy source) to reverse it but to allow it to reverse naturally. Once the magnetization current is removed the motor coil's core will automatically begin to demagnetize to a certain degree due to the collapsing external magnetic field and according to the quality of the core material employed and the narrowness of the hysteresis curve. FIG. 8 shows the inductor transient nature of a motor coil where a battery is connected to a series resistor and an inductor, the inductor resists the change in current and the current therefore builds up slowly.

Figure 9:
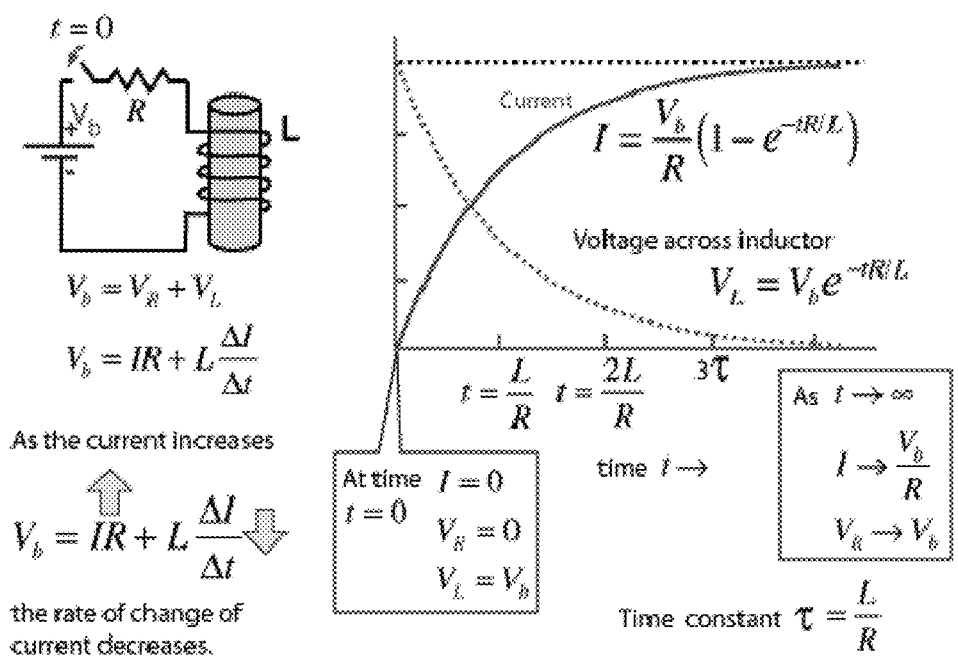
FIG. 9 illustrates the Inductor Resistor Mathematical 5 Time Constant Rise Time and Decay Time.

The rate of this buildup is characterized by the Time Constant L/R of the motor coil (see FIG. 9) which is the inductance of the coil (L) divided by the coil's internal DC resistance (R). It takes 5 Time Constants for the current to reach its maximum level and for the coil's magnetic field to be fully established.

Acting in accordance with Faraday's law and Lenz's law, the amount of impedance to the buildup of current is proportional to the rate of change of the current. That is, the faster it changes, the more it resists and the longer it takes to reach its full value. The current builds up towards the value it would have (after 5 Time Constants) with the resistor alone because once the current is no longer changing, the inductor offers no impedance. Establishing a magnetization current in an inductor causes the inductor to store energy in the magnetic field formed by the coils of the inductor.

Once the magnetization current is removed the energy stored in the magnetic field around the coil will collapse back into the coil and the process will be reversed where the magnetic field energy is reconverted back to electric energy according to Faraday's law and after 5 time constants has been reached—but only if it allowed to do so.

Prior art electric motors do not allow for this and the energy required to create the magnetic field around the coil is completely wasted when it is reversed as quickly as possible when the current direction into the coil is reversed as quickly as possible. The electromagnetic field energy created around a motor coil is deliberately dissipated into free space where it is known to adversely affect living tissue in its vicinity. To make matters even worse the energy stored in the magnetic field which is wasted in present electric motor design and operation could be recovered to a certain degree and it could also be used to assist in the reversal of the magnetic field domains inside the motor coil's cores while reducing the energy costs associated with core hysteresis and magnetic field reversal. In this manner input energy costs required to provide the magnetization current in order to establish the motor coil's external magnetic field could be recovered while the energy required to reverse its direction could be reduced. FIG. 10 shows the ReGenX pulsed motor circuit of the present invention where the three different modes of operation are shown.

FIG. 10, Motor Mode (1) demonstrates how the magnetization current is employed to establish the magnetic field around the motor coil. This magnetic field has the effect of acting against the rotor's magnetic field at Time 0 (T0) and inducing rotation in the motor's rotor by repelling the North Pole magnet on the rotor while also attracting the rotor's South Pole until Time 2 (T2). The pulse duration is Time 1 (T1).

FIG. 10, Flyback Mode (2) begins at Time 2 once the input current pulse has ceased, the switch in the motor circuit connects the terminals of the motor coil to an external storage device such that the collapsing magnetic field energy surrounding the motor coil can be redirected into an external storage device such as a battery, capacitor etc. The motor coil and external storage device are disconnectably connected to each other; in other words, the motor circuit, otherwise referred to herein as 'motor control circuit' or 'controller', is able to make and break this connection. Flyback Mode is accompanied simultaneously by the initiation of Generator Mode from T2 to T3.

In accordance with the present invention, Flyback Mode is a mode of operation whereby the magnetic field energy stored externally around the motor coil is allowed to be reconverted back into electrical energy. The direction of the collapsing magnetic field energy's current is reversed and current flows out of the motor coil and into the external energy storage device. During this process the magnetic field domains in the core also begin to reverse direction as a direct result but this magnetic field domain reversal process does not require any extra energy to be supplied externally. As soon as the rotor's North Pole magnetic field begins to move away from the motor coil's core at top dead center and the input motor current has ceased and the motor circuit switches such that the motor coil enters Flyback Mode the motor coil of the present invention simultaneously becomes a generator coil. The direction of returning magnetization current from the motor coil's externally stored electromagnetic field energy is the same direction as the induced current direction that is being generated from the rotor's South Pole which is now coming into position and the two currents are additive.

From the moment the rotor's North Pole magnetic field begins to move away from the ReGenX Motor coil's core at top dead center—two types of electric current begin to flow to the external storage device, (1) the current from the motor coil's stored magnetic field energy and (2) the induced current from the motor coil now operating in generator mode and this process continues until the next North Pole rotor magnetic field comes into position at top dead center to the motor coil's core. When the rotor's next North Pole magnetic field reaches top dead center to the motor coil's core the process is repeated and the input magnetization current is delivered to the motor coil once again.

The energy required to reverse the magnetic field domains against hysteresis in the motor coils' cores has been almost completely eliminated and the small amount of energy that is required is provided by rotor inertia or vehicle inertia in the case of electric vehicle motor operation.

Figure 12:
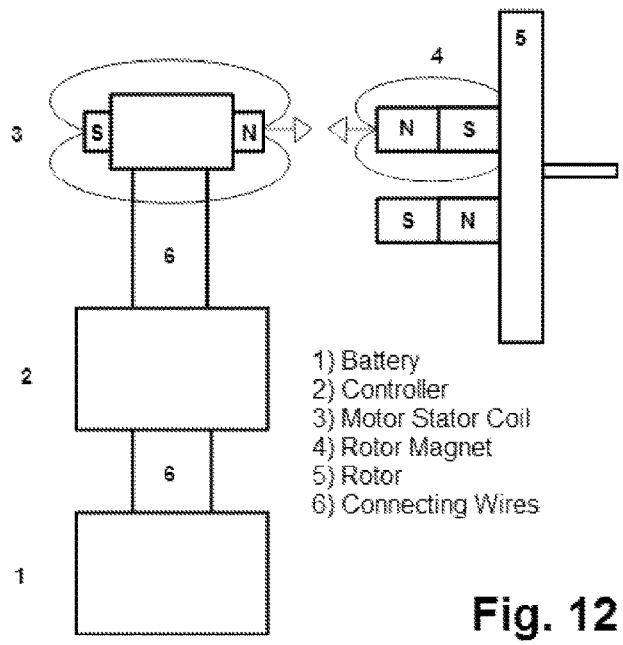
FIG. 12 is a list of components for the motor/generator of the present invention.

FIG. 12 is a list of components for the ReGenX Motor. Electric current from the battery (1) is supplied to the motor control circuit (2) via the connecting wires (6) to the motor stator coil (3). A magnetic field (8) is established around the stator motor coil (3) which has the effect of acting against the motor's rotor magnets (4), repelling the same polarity magnetic field (10) and attracting the opposite magnetic field which has the effect of rotating the rotor (5) and producing mechanical output power on the motors drive shaft.

Figure 13:
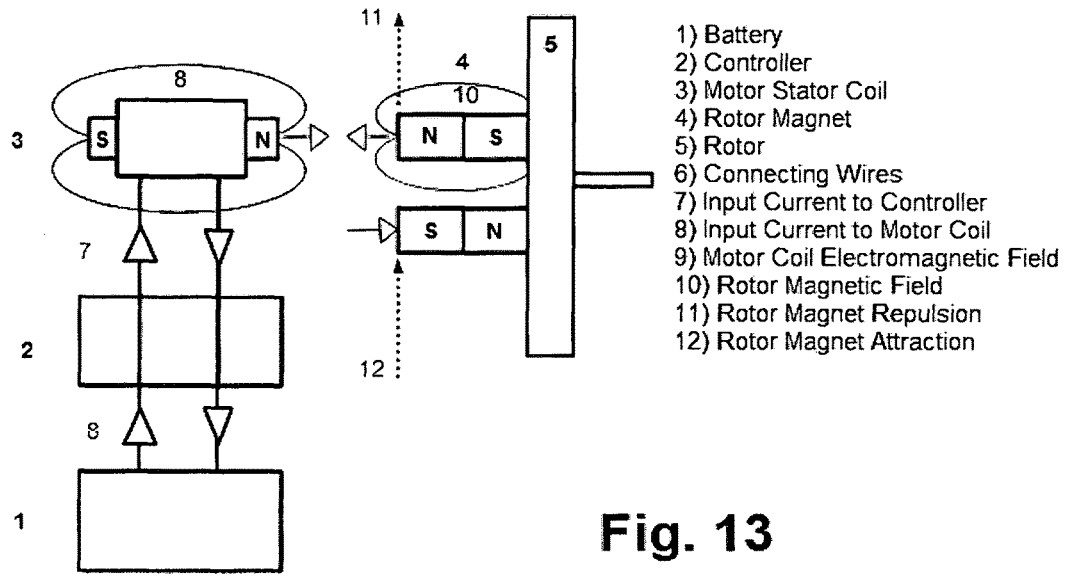
FIG. 13 shows the input current directions when the present invention is operating in Motor Mode.

The ReGenX Motor has three different modes of operation.
1. Motor Mode.
2. Flyback Mode
3. Generator Mode FIG. 13 shows the input current (7) directions when the motor of the present invention is operating in Motor Mode where electric energy from the battery is used to create electromagnetic field energy around the motor coil which in turn produces mechanical energy in the motor's drive shaft output (rotation). As soon as the ReGenX Motor's input current pulse ceases, the ReGenX Motor enters Flyback Mode where the motor control circuit (2) reverses the current direction so the collapsing electromagnetic field energy (8) can be returned back to the battery or another suitable energy storage container—as is shown in FIG. 13.

Figure 14:
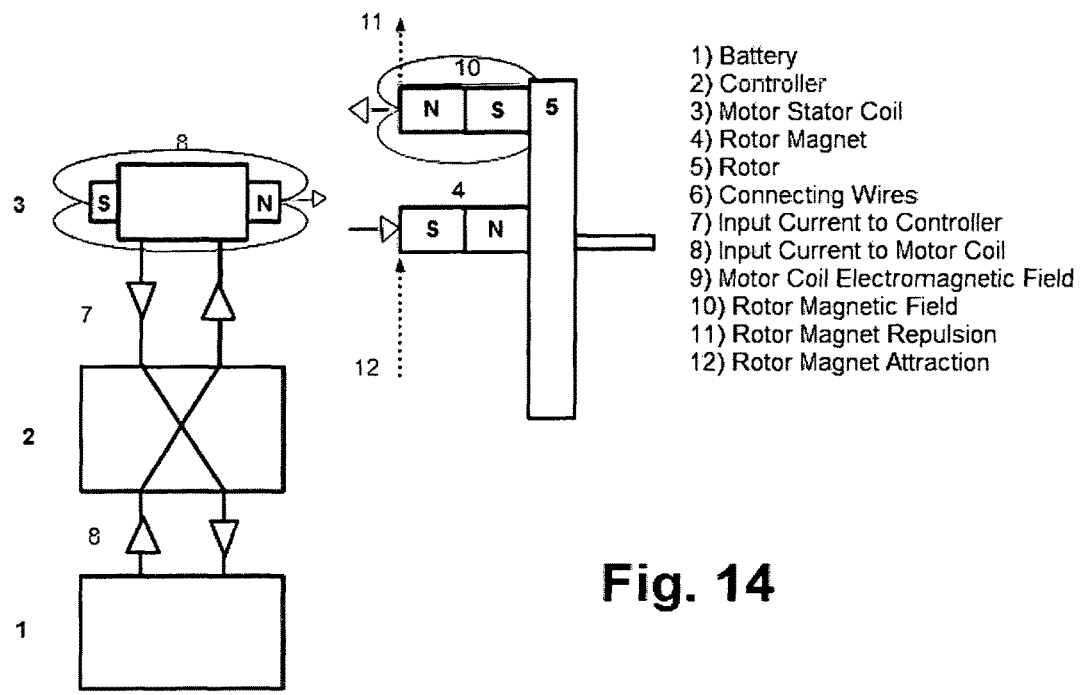
FIG. 14 shows Flyback Mode and Generator Mode of the present invention.

As shown in FIG. 14, in the present invention, Flyback Mode and Generator Mode occur simultaneously such that the collapsing motor coil magnetic field's (9) current direction is the same as the current being induced in the ReGenX Coil which is operating in Generator Mode as the opposite magnetic field polarity passed by the ReGenX Coil. As previously mentioned the motor coil of the present invention only pulses in motor mode on the same rotor magnet polarity and does not reverse as per conventional motor operation.

Flyback Mode and Generator Mode operation continue until the next North Pole rotor magnet comes into position at Top Dead Centre in front of the motor coil at which point the motor circuit delivers electric current to the motor coil and another electromagnetic pulse is created and the process is repeated.

In this manner the motor of the present invention does not have to supply energy to the motor coil to reverse the magnetic domains in the motor coil's core against core hysteresis. The energy required to reverse the magnetic field domains in the core are provided by the mechanical inertia and torque of the motor's rotor in concert with the complementary electromotive torque supplied by the Coil of the present invention operating in its inventive Generator Mode. The motor's coils stored electromagnetic field energy which, in the prior art, is shorted out, wasted and dangerously dissipated into free space by conventional motor design and operation is now returned to the source in a much more efficient and safe manner.

Hysteresis losses are reduced and or eliminated and the parasitic losses associated with Armature Reaction/Generator Action in a Motor are reversed such that generator action in a motor becomes a synergistic benefit in generating usable electric power in tandem with the collected and returned motor coil electromagnetic field energy.

As shown in FIGS. 15A & B, in prior art conventional DC motors, operation is characterized by a pulsed DC motor controller alternating the motor coils' magnetic field polarity thousands of times per minute. The energy stored in the electromagnetic field is dissipated into free space once the pulse duration is complete and wasted. In contrast to the prior art conventional motor, in operation, the present invention does not alternate magnetic field pulse direction.

Once the current pulse has ceased, the controller allows the Flyback (collapsing magnetic field energy) to be redirected back to the EV batteries (1) in concert with ReGenX Generator Action/Induced Current (2) from the motor's South Pole rotor magnetic field. The collapsing magnetic field current (1) and the generated current (2) add together and recharge the EV battery accordingly. Motor motive torque is maintained through the power generation cycle (2) by the nature of the Generator Coil of the present invention which creates a Complementary-Electromotive-Torque which contributes positively to motive motor torque produced during the motor cycle Those experienced in the field of this invention should, based on the detailed descriptions of the objectives and new methods, be able to understand the logical possible variations. They will be able to adopt appropriate strategies depending on the various applications and needs of electric motors and generators, not specifically shown in this application, but within the general goals and objectives of this invention.

Examples disclosed are intended to be limiting only as reflected in the appended claims.

I claim:

1. A controlled motor/generator apparatus, said motor/generator comprising
   a coil of wound, insulated wire
   surrounding the coil, alternating magnetic polarities on a rotor having a driveshaft
   a sensor mounted, or communicating with an emitter mounted, on the driveshaft or rotor and connected to a motor circuit
   a DC pulsed motor circuit capable of delivering an electric current pulse and connected to and operating a switch, said switch being connected to the terminals of said wire and disconnectably connecting said terminals to an electrical storage device in order to switch said motor/generator between a motor mode, a generator mode and a flyback mode such that when activated by said current pulse, said coil operates as an electric motor and electric generator
   a controller capable of causing the motor circuit to deliver said electric current pulse to the motor coil according to timing and the duty cycle determined by input from the sensor
   wherein the improvement comprises
   the controller directs the pulsed motor circuit to begin generator operation during the flyback process, causing the motor to simultaneously produce mechanical power and alternating electric output power (AC) wherein
   the magnetic field produced around the coil interacts with primary and secondary magnetic field polarities of the rotor to create dynamic torque and angular acceleration of the rotor
   on primary rotor pole motion away from the coil, the sensor signals to the motor circuit to cut current in the coil and a switch inside the motor circuit then connects the coil to an external electrical storage device such that the stored magnetic field energy that was created in motor mode and which exists around the coil collapses and returns some electric current back into the external electrical storage device in flyback mode, said returning current flowing into the external electrical storage device in the same direction as the induced voltage and induced current which is now being produced by the interaction of the secondary rotor magnet polarity which is now moving into position and passing the coil in generator mode
   generator action continues until the sensor tells the switch to cease generator mode and re-initiate motor mode and deliver another DC current pulse to the coil in the same direction as the original pulse.

2. The controlled motor/generator apparatus of claim 1 wherein the coil receives electric current on one rotor pole, operates as a motor on said rotor's magnetic field polarity creating angular acceleration and rotor momentum then as a generator and an electromagnetic field recycler on the next opposite alternating magnetic field pole polarity when the rotor's momentum causes the next, opposite, magnetic field polarity to continue moving past the coil in generator mode.

3. The controlled motor/generator apparatus of claim 1 wherein the external storage device is a battery.

4. The controlled motor/generator apparatus of claim 1 wherein the external storage device is a capacitor.

5. The controlled motor/generator apparatus of claim 1 wherein the sensor is selected from the list of optical, Hall effect, Reed switch or commutator.

6. The controlled motor/generator apparatus of claim 5 wherein the optical sensor comprises a LED/photodiode pair.

7. The controlled motor/generator apparatus of claim 6 wherein the sensor comprises a photodiode and LED mounted on a stationary element in proximity to the motor and in communication with a reflective element mounted on the rotor or driveshaft.

8. The controlled motor/generator apparatus of claim 1 wherein the size and power rating of said motor are selected to propel a vehicle.

9. A method of operating a motor/generator apparatus, said motor/generator comprising
- a coil of wound, insulated wire
- surrounding the coil, alternating magnetic polarities on a rotor having a driveshaft
- a sensor mounted, or communicating with an emitter mounted, on the driveshaft or rotor and connected to a motor circuit
- a DC pulsed motor circuit capable of delivering an electric current pulse and connected to and operating a switch, said switch being connected to the terminals of said wire and disconnectably connecting said terminals to an electrical storage device in order to switch said motor/generator between a motor mode, a generator mode and a flyback mode such that when activated by said current pulse, said coil operates as an electric motor and generator, the method comprising
- causing the motor circuit to deliver said electric current pulse to the motor coil according to timing and the duty cycle determined by input from the sensor wherein the improvement comprises
- directing the pulsed motor circuit to begin generator operation during the flyback process, causing the motor to simultaneously produce mechanical power and alternating electric output power (AC); wherein
- the magnetic field produced around the coil interacts with the magnetic field of a primary rotor pole to create dynamic torque and angular acceleration of the rotor
- once the primary rotor pole moves away from the coil the sensor signals to the motor circuit to cut the current and a switch inside the motor circuit then connects the coil to an external electrical storage device such that the stored magnetic field energy that was created in motor mode and which exists around the coil collapses and returns some electric current back into the electrical storage device in flyback mode, said returning current flowing into the external electrical storage device in the same direction as the induced voltage and induced current which is now being produced by the interaction of the opposite (secondary) rotor magnet polarity which is now moving into position and passing the coil in generator motor
- the previous motor action's collapsing electromagnetic field current and rotating rotor magnetic field-induced current flow in the same direction and add together to charge the external electrical storage device
- generator action continues until the sensor tells the switch to cease generator mode and re-initiate motor mode and deliver another DC current pulse to the coil in the same direction as the original primary pulse.

10. The method of claim 9 wherein the coil receives electric current on one primary rotor pole, operates as a motor on said rotor's primary magnetic field polarity creating angular acceleration and rotor momentum then as a generator and an electromagnetic field recycler on the next opposite secondary alternating magnetic field pole polarity when the rotor's momentum causes the next, opposite, secondary magnetic field polarity to continue moving past the coil in generator mode.

11. The method of claim 9 wherein said external storage device is a battery.

12. The method of claim 9 wherein said external storage device is a capacitor.

13. The controlled motor/generator apparatus of claim 9 wherein the sensor is selected from the list of optical, Hall effect, Reed switch or commutator.

14. The method of claim 13 wherein the optical sensor comprises a LED/photodiode pair.

15. The method of claim 14 wherein the sensor comprises a photodiode and LED mounted on a stationary element in proximity to the motor and in communication with a reflective element mounted on the rotor or driveshaft.

16. The method of claim 9 wherein the size and power rating of said motor are selected to propel a vehicle.

\* \* \* \* \*